(12) United States Patent
Hartmann et al.

(10) Patent No.: US 10,598,207 B2
(45) Date of Patent: Mar. 24, 2020

(54) HIGH-STRENGTH SCREW INCLUDING AN UNHARDENING LAYER

(71) Applicant: KAMAX Holding GmbH & Co. KG, Homberg (Ohm) (DE)

(72) Inventors: Gunther Hartmann, Alsfeld (DE); Horst Dieterle, Weimar (DE)

(73) Assignee: KAMAX HOLDING GMBH & CO. KG, Homberg (Ohm) (DE)

( * ) Notice: Subject to any disclaimer, the term of this patent is extended or adjusted under 35 U.S.C. 154(b) by 338 days.

(21) Appl. No.: 15/659,993

(22) Filed: Jul. 26, 2017

(65) Prior Publication Data

US 2018/0031023 A1   Feb. 1, 2018

(30) Foreign Application Priority Data

Jul. 29, 2016 (DE) .......................... 10 2016 114 111
Aug. 29, 2016 (EP) .................................... 16186168

(51) Int. Cl.
| | | |
|---|---|---|
| *F16B 35/04* | (2006.01) | |
| *F16B 33/06* | (2006.01) | |
| *B23G 9/00* | (2006.01) | |
| *C21D 9/00* | (2006.01) | |
| *F16B 35/00* | (2006.01) | |

(52) U.S. Cl.
CPC .............. *F16B 33/06* (2013.01); *B23G 9/001* (2013.01); *C21D 9/0093* (2013.01); *F16B 35/00* (2013.01); *C21D 2211/002* (2013.01)

(58) Field of Classification Search
CPC ....................................................... F16B 33/02
USPC ........................................................... 411/424
See application file for complete search history.

(56) References Cited

U.S. PATENT DOCUMENTS

| | | | | |
|---|---|---|---|---|
| 3,301,120 A | * | 1/1967 | Lloyd ..................... | F16B 35/00 411/411 |
| 3,884,116 A | * | 5/1975 | Hage ...................... | F16B 33/008 428/592 |
| 5,484,244 A | * | 1/1996 | Glovan ................. | F16B 1/0014 29/447 |
| 6,109,851 A | * | 8/2000 | Bauer .................. | C21D 9/0093 411/387.7 |
| 7,824,142 B2 | | 11/2010 | Felder et al. | |
| 7,976,258 B2 | * | 7/2011 | Asai ...................... | C23C 28/023 411/424 |
| 9,145,910 B2 | | 9/2015 | Dieterle | |

FOREIGN PATENT DOCUMENTS

| | | |
|---|---|---|
| DE | 10 2007 000 485 B3 | 10/2008 |
| DE | 10 2014 220 338 A1 | 4/2016 |
| EP | 2594653 A1 | 5/2013 |

* cited by examiner

*Primary Examiner* — Gary W Estremsky
(74) *Attorney, Agent, or Firm* — Thomas | Horstemeyer, LLP

(57) ABSTRACT

A high-strength screw (2) includes a threaded portion (7) having a thread (8). The screw (2) includes an inner core (16) as seen in cross-section of the screw (2), the core (16) having a first hardness. The screw (2) includes an outer surface layer (17) as seen in cross-section of the screw (2). The screw (2) includes an unhardening layer (18) forming the outer surface layer (17) in the threaded portion (7), the unhardening layer (18) having a second hardness being reduced compared to the first hardness of the core (16).

15 Claims, 5 Drawing Sheets

| P | H [mm] | T2 [mm] H/3 [mm] | 0.5 T1 [mm] | 1 T1 [mm] | 1.5 T1 [mm] | 2 T1 [mm] | 2.5 T1 [mm] | 3 T1 [mm] |
|---|---|---|---|---|---|---|---|---|
| 0.50 | 0.400 | 0.133 | 0.37 | 0.87 | 1.37 | 1.87 | 2.37 | |
| 0.75 | 0.433 | 0.144 | 0.36 | 0.86 | 1.36 | 1.86 | 2.36 | |
| | 0.650 | 0.217 | 0.28 | 0.78 | 1.28 | 1.78 | 2.28 | |
| | 0.700 | 0.233 | 0.27 | 0.77 | 1.27 | 1.77 | 2.27 | |
| 1.00 | 0.866 | 0.289 | 0.21 | 0.71 | 1.21 | 1.71 | 2.21 | 2.71 |
| | 1.000 | 0.333 | | 0.67 | 1.17 | 1.67 | 2.17 | 2.67 |
| 1.25 | 1.083 | 0.361 | | 0.64 | 1.14 | 1.64 | 2.14 | 2.64 |
| 1.50 | 1.299 | 0.433 | | 0.57 | 1.07 | 1.57 | 2.07 | 2.57 |
| | 1.500 | 0.500 | | 0.50 | 1.00 | 1.50 | 2.00 | 2.50 |
| 1.75 | 1.516 | 0.505 | | 0.49 | 0.99 | 1.49 | 1.99 | 2.49 |
| 2.00 | 1.732 | 0.577 | | 0.42 | 0.92 | 1.42 | 1.92 | 2.42 |
| | 2.000 | 0.667 | | 0.33 | 0.83 | 1.33 | 1.83 | 2.33 |
| 2.50 | 2.165 | 0.722 | | 0.28 | 0.78 | 1.28 | 1.78 | 2.28 |
| | 2.500 | 0.833 | | 0.17 | 0.67 | 1.17 | 1.67 | 2.17 |
| 3.00 | 2.598 | 0.866 | | | 0.63 | 1.13 | 1.63 | 2.13 |
| | 3.000 | 1.000 | | | 0.50 | 1.00 | 1.50 | 2.00 |
| 4.00 | 3.464 | 1.155 | | | 0.35 | 0.85 | 1.35 | 1.85 |
| | 3.500 | 1.167 | | | 0.33 | 0.83 | 1.33 | 1.83 |

Fig. 5

HIGH-STRENGTH SCREW INCLUDING AN UNHARDENING LAYER

CROSS REFERENCE TO RELATED APPLICATIONS

This application claims priority to German Patent Application No. DE 10 2016 114 111.9 filed Jul. 29, 2016 and European patent application EP 16 186 168.7 filed Aug. 29, 2016.

FIELD OF THE INVENTION

The invention relates to a high-strength screw including a threaded portion having a thread.

BACKGROUND OF THE INVENTION

An ultra-high-strength screw is known from European patent application EP 2 594 653 A1 corresponding to U.S. Pat. No. 9,145,910 B2.

A high-strength screw is known from U.S. Pat. No. 3,301,120. The threaded portion of the screw is tempered such that it has a reduced hardness compared to the inner core of the screw.

A screw is known from German patent application No. DE 10 2014 220 338 A1. The screw is a hybrid screw consisting of two different materials. The screw includes an inner core being made of a harder material such as a high-strength aluminum alloy. The cover material is different and may be aluminum, aluminum alloy, magnesium, magnesium alloy, copper or copper alloy.

Another hybrid screw being made of different materials is known from German patent No. DE 10 2007 000 485 B3 corresponding to U.S. Pat. No. 7,824,142 B2.

SUMMARY OF THE INVENTION

The invention relates to a high-strength screw including a threaded portion having a thread. The screw includes an inner core as seen in cross-section of the screw, the core having a first hardness. The screw includes an outer surface layer as seen in cross-section of the screw. The screw includes an unhardening layer forming the outer surface layer in the threaded portion, the unhardening layer having a second hardness being reduced compared to the first hardness of the core.

The invention also relates to a method of producing a high-strength screw including the following steps:
  manufacturing a blank including a head and a shaft by deformation,
  heat-treading of the blank for attaining an increased hardness,
  reducing the hardness of the blank at least in a part of the axial length of the shaft to produce an unhardening layer being designed as an outer surface layer as seen in cross-section having a hardness being reduced compared to the core of the screw, and
  manufacturing a threaded portion by deformation of a thread in a portion of the shaft being spaced apart from the head.

These method steps are conducted in the given order. However, it is also possible to conduct additional steps between these method steps.

The new high-strength screw can be manufactured with less tool wear during rolling of the thread.

A high-strength screw is to be understood as a screw having a tensile strength $R_m$ of at least 800 N/mm². High-strength screws are essentially understood as screws of the property classes 8.8, 10.9 and 12.9. However, the high-strength screw according to the invention may also be an ultra-high-strength screw having a tensile strength $R_m$ of at least 1400 N/mm². The "high-strength" screw according to the invention is thus at least a high-strength screw, but it can also be an ultra-high-strength screw.

For example, the new high-strength screw may be a screw the core of which corresponds to an ultra-high-strength screw, the outer surface portion of which however "only" corresponds to a high-strength screw. This new screw may thus also be used in application cases in which so far only screws with a property class of 10.9 or lower have been used.

The term "unhardening layer" as used in this application is not a standard technical term. It is to be understood in this application as designating an outer surface layer of the screw as seen in cross-section, the surface layer having a reduced hardness compared to the core of the screw. "Unhardening" could also be called "softening". However, the specific and somewhat unusual term of "unhardening" is intended to better express that the previously increased hardness of the material has been reduced. As a result, the layer is not soft, but it is less hard than before. It is still harder than the material that has not been hardened at all. Thus, this term especially does not mean that the previously conducted process of hardening has been completely undone.

Due to the creation of a defined hardness profile and strength profile over the cross-section of the screw, the invention allows for the manufacture of threads on the heat-treaded shaft of the screw by deformation while maintaining the high load capacity of the screw. At the same time, excellent fatigue strength properties of the screw can be realized thereby due to the residual compressive stress induced in the threaded portion during rolling. An overload of the material during manufacture of the thread by deformation in the high-strength condition and ultra-strength condition, respectively, is prevented.

Due to the new unhardening layer in the region of the thread, there is no crack formation due to an overload of the material caused by the deformation process. The rolling forces required for producing the thread are reduced. Reduced tool wear results therefrom.

Due to the reduced hardness in the outer surface portion, the new screw has increased resistance against hydrogen induced stress corrosion cracking.

The radial inner limit of the unhardening layer is fluent. However, it may be defined such that there is a hardness value corresponding to between 96% and 99%, especially 98%, of the hardness value of the core.

The screw has a longitudinal center axis. This is the axis about which the screw is rotated during tightening and loosening of a screw joint. The thread of the threaded portion of the screw has a height H corresponding to the height of the sharp-cut imaginary profile section. The thread has a thread tip winding about the longitudinal axis and having a diameter d, and a thread base winding about the longitudinal center axis and having a diameter d3. The unhardening layer has a depth T1 existing along the thread tip winding about the longitudinal center axis and being measured in a radial direction perpendicular to the longitudinal center axis up to an imaginary axial connecting line between two positions of the thread base being adjacent and being offset by 360°. This definition of T1 is easier to understand when inspecting FIG. 2. The unhardening layer has a depth T varying along the longitudinal center axis of the screw. The respective depth T however depends on whether there is a thread tip, a thread base or a threadless portion in the respective portion. This varying depth T of the unhardening layer results from the deformation process during manufacture of the thread. The definition of the depth T1 thus serves to be able to determine the depth T of the unhardening layer in a specific portion without having to indicate its value.

Another definition is that the core is to be understood as the inner portion of the screw as seen in cross-section up to a diameter of the core dk=d/4. The hardness of the core is to be understood as the average of the hardness within the diameter of the core dk.

The hardness of the unhardening layer may also be understood as the average of the hardness within the unhardening layer. This definition makes sense since there are different hardness values at different locations of the unhardening layer in a radial direction. The unhardening layer is harder in its radial inner portion than in its radial outer portion. Thus, the hardness increases from the outside towards the inside in the unhardening layer.

The above-defined depth T1 may be between 0.1 mm and 3.0 mm, especially between 0.2 mm and 2.8 mm.

The thread of the threaded portion of the screw may have one of the following pairs of values:
 height H: 0.4 mm to 0.7 mm; depth T1: 0.25 mm to 1.8 mm, or
 height H: 0.71 mm to 1.0 mm; depth T1: 0.25 mm to 2.7 mm, or
 height H: 1.01 mm to 1.5 mm; depth T1: 0.2 mm to 2.7 mm, or
 height H: 1.51 mm to 2.0 mm; depth T1: 0.2 mm to 2.7 mm, or
 height H: 2.01 mm to 2.5 mm; depth T1: 0.15 mm to 3.0 mm, or
 height H: 2.51 mm to 4.0 mm; depth T1: 0.15 mm to 4.0 mm.

The unhardening layer may have a hardness at its outside of 300 HV to 450 HV, especially of 320 HV to 380 HV. The core may have a hardness of 400 HV to 650 HV, especially of 450 HV to 570 HV. The hardness values of the unhardening layer and of the core are coordinated in a way that the unhardening layer has a lower hardness than the core. In this sense, the core may especially have a hardness of 400 HV to 650 HV, especially of 450 HV to 570 HV, and the unhardening layer at its outside may have a hardness of 300 HV to 380 HV. The outside is to be understood as the radial outer portion of the unhardening layer.

The hardness of the unhardening layer at its outside may be at least 7%, especially between 10% and 50%, especially between 20% and 40%, reduced compared to the hardness of the core.

The average of the hardness of the unhardening layer may be reduced by at least 5%, especially between 7% and 45%, especially between 10% and 35%, compared to the hardness of the core.

The unhardening layer at its outside may have a tensile strength of between 940 N/mm$^2$ and 1400 N/mm$^2$, especially between 1000 N/mm$^2$ and 1200 N/mm$^2$. The core may have a tensile strength of between 1300 N/mm$^2$ and 2500 N/mm$^2$, especially between 1400 N/mm$^2$ and 1850 N/mm$^2$. These values of the strength of the unhardening layer and of the core are coordinated with one another such that the unhardening layer has a lower strength than the core. The core may especially have a tensile strength of between 1300 N/mm$^2$ and 2000 N/mm$^2$, especially between 1400 N/mm$^2$ and 1850 N/mm$^2$, and the unhardening layer at its outside may have a tensile strength of between 1000 N/mm$^2$ and 1200 N/mm$^2$.

In addition to the threaded portion, the screw also includes a head. It may additionally include a threadless shank portion.

The threadless shank portion may also include an unhardening layer being designed as an outer surface portion as seen in cross-section having a hardness being reduced compared to the core of the screw. The above-described advantages of the unhardening layer may thus not only be applied to the threaded portion, but also to a threadless shank portion. The unhardening layer may either extend along the entire length of the shank portion or only along a part of the length. It may also extend along the head bearing transition surface—i.e. the transition surface between the head bearing surface of the head of the screw and the threadless shank portion.

In the above-described method of manufacturing a high-strength screw, reducing the hardness may be realized by inductive heating of the blank. This is especially achieved by a live coil being subjected to an electromagnetic alternating field and producing eddy currents in the material of the blank. Since these flow in the opposite direction than the initial current, heat is created.

Cooling of the blank may follow the inductive heating of the blank. This is especially advantageous if heating of the steel and of the surface layer, respectively, is limited to a temperature below the beginning of austenite transformation Ac1 of between 500° C. and 750° C., especially between 600° C. and 723° C. Due to the coordination of the steps of heating and cooling, the desired reduction of the hardness and of the strength is attained. Cooling is especially realized by water having a temperature of approximately 10° C. to approximately 50° C. Cooling may occur over a period of time of between approximately 0.05 s and 30 s, especially between approximately 0.1 s and 10 s.

Inductive heating may be realized at a frequency of between 20 kHz and 500 kHz, especially between approximately 100 kHz and 400 kHz. Inductive heating may be realized over a period of time of between approximately 0.05 s and 30 s, especially between approximately 0.1 s and 10 s.

However, the reduction of the hardness by heating the blank may also be realized by a laser, for example. Especially, controlled cooling for attaining the desired reduction of the hardness of the unhardening layer may follow this heating.

In all above-described method steps, the screw may include one or more of the above-described features.

Heat treatment may be especially austempering. The deformation for producing the threaded portion may be especially rolling. Especially, the process may be cold forming.

The new high-strength screw is made of steel. It may include a bainite structure which especially has at least partly been produced by austempering. The bainite structure results in an extremely high tensile strength while ductility is still also very high. This high ductility or toughness differentiates the bainite structure substantially from a martensite structure which is produced in the prior art in a known way by hardening and following annealing. Instead, during austempering, hardening is realized by rapid cooling from the austenite phase due to an isothermal structural transformation in the bainite phase. The element, especially the screw, is located in a salt bath at an isothermal temperature until the structural transformation from austenite to bainite has been completed over the entire cross-section. The annealing step being required during martensite hardening may be preferable omitted. Thus, the tendency of hardening distortion is reduced.

The starting material used for producing the high-strength screw is usually called "wire". The wire used for the new high-strength screw may be made of cold formable non-hardened and non-tempered steel, and it may have a carbon content of approximately 0.2% to 0.6% or approximately 0.2% to 0.5%. The steel may include alloying elements, especially Cr, Mo, Mn, Ni, V, Nb or Ti with a total share of especially more than approximately 1.1%.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if a threaded portion is mentioned, this is to be understood such that there is exactly one threaded portion or there are two threaded portions or more threaded portions. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

FIG. 5 illustrates exemplary values of the unhardening layer associated with different screw sizes in a table.

DETAILED DESCRIPTION

Figure 1:
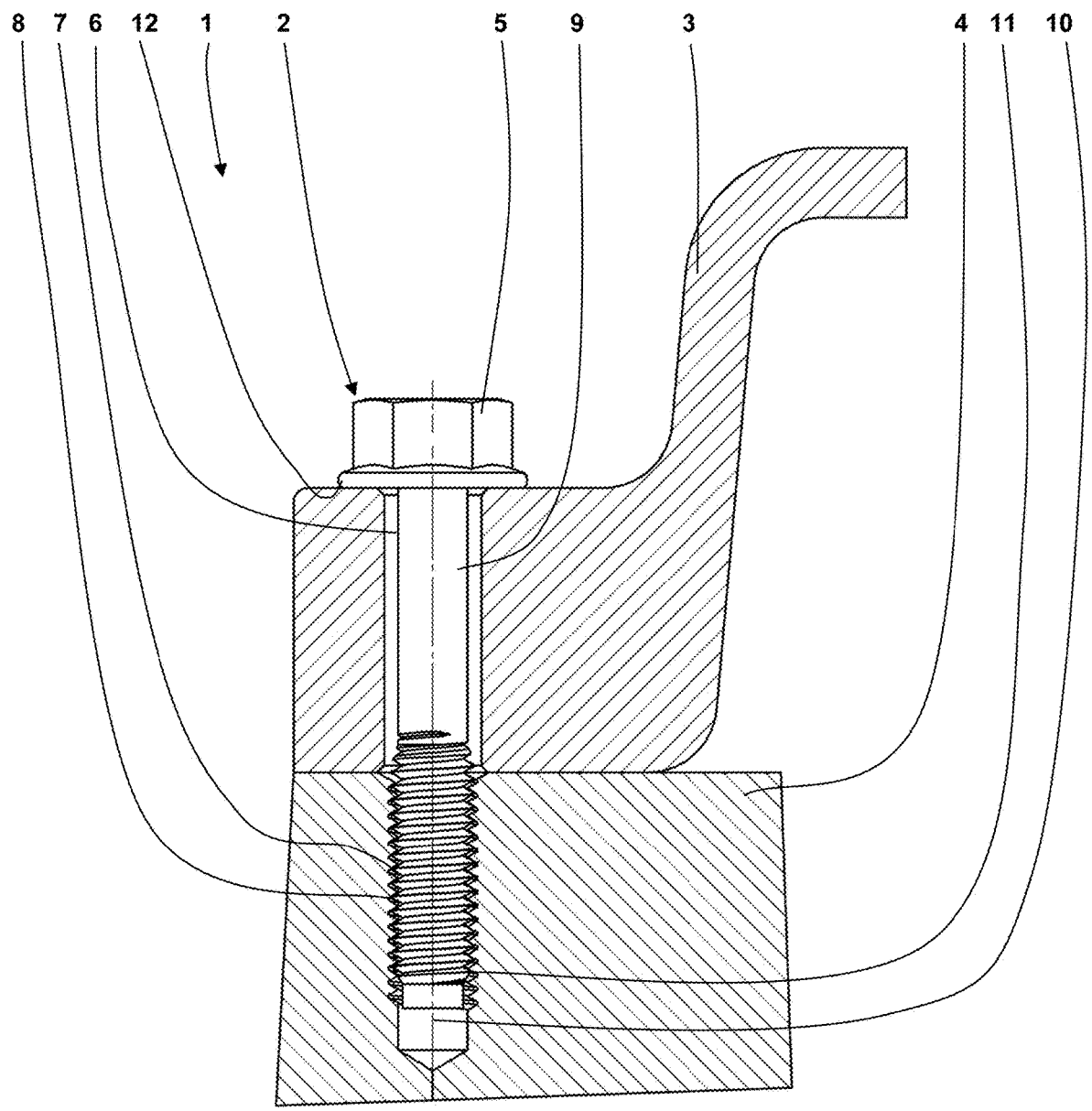
FIG. 1 illustrates a (partial) longitudinal section through a screw joint including a new high-strength screw.

FIG. 1 illustrates an exemplary embodiment of a screw joint 1 including a new high-strength screw 2 as well as a first component 3 and a second component 4. The screw 2 includes a head 5, a threadless shank portion 6 and a threaded portion 7 having a thread 8 being designed as an outer thread. The first component 3 includes a bore 9 and the second component 4 includes a bore 10. The bore 10 includes an inner thread 11 corresponding to the outer thread of the screw 2. The clamping force required for attaining the secure screw joint 1 is realized by the engagement of the threads 8, 11 and the head bearing surface 12 of the head 5 of the screw 2.

The screw 2 is a high-strength screw 2 having a tensile force of at least 800 N/mm$^2$, especially an ultra-high-strength screw having a tensile strength of at least 1400 N/mm$^2$. The screw 2 includes a bainite structure that has especially been produced by austempering and that extends substantially over the entire cross-section of the screw 2.

Figure 2:
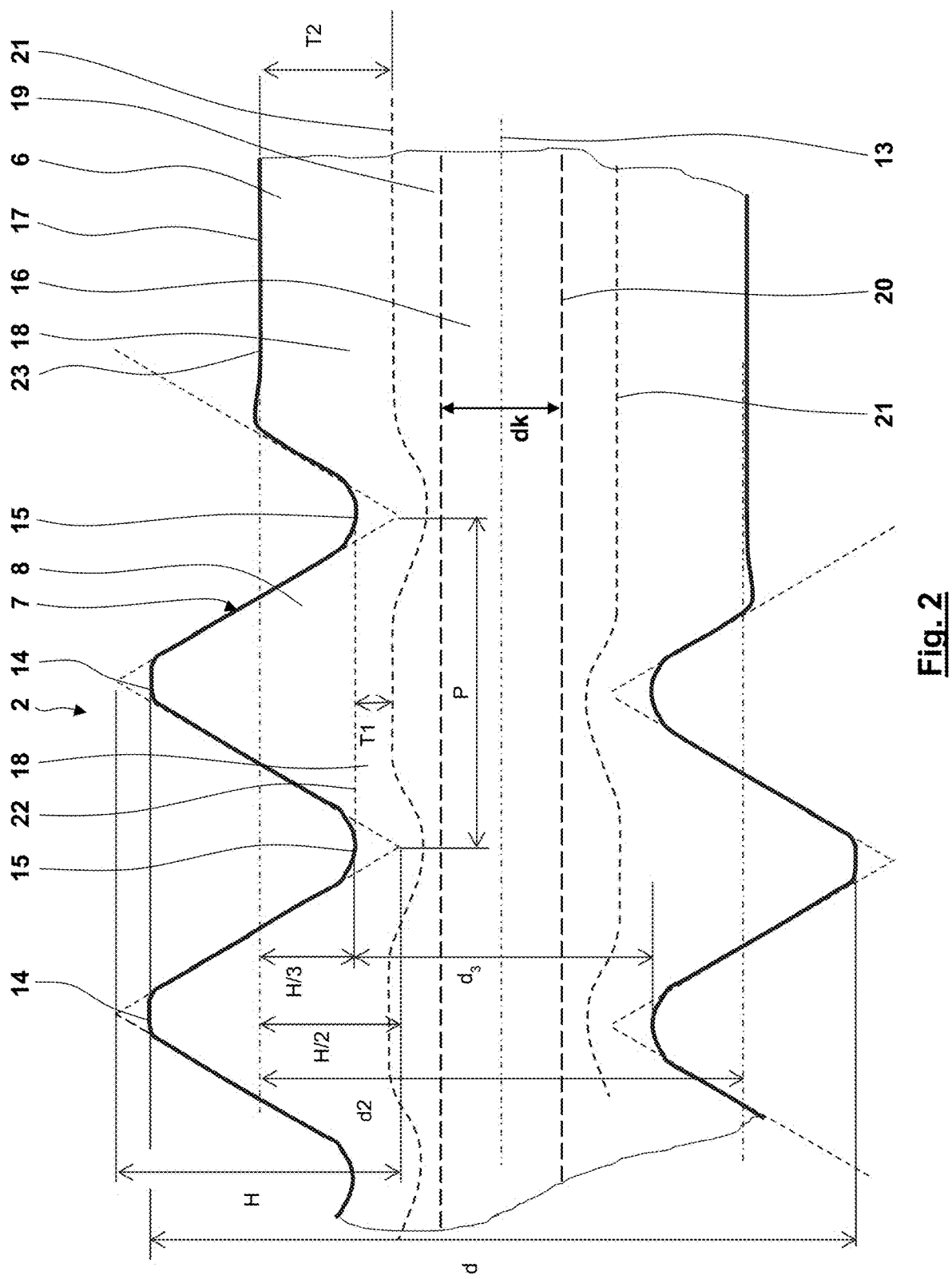
FIG. 2 illustrates a longitudinal section through a part of the screw.

FIG. 2 illustrates a cross-section through the high-strength screw 2 having a longitudinal center axis 13. The thread 8 furthermore includes a thread tip 14 winding about the longitudinal axis 13 in a usual way and a thread base 15 also winding about the longitudinal axis 13. The thread 8 may be a metric thread 8 or a different thread 8.

The screw 2 includes a core 16 extending in the region of the longitudinal center axis 13 and the radial portion between the lines 19 and 20 surrounding it.

A surface layer 17 is located in the portion of the screw 2 being distant to the core 16 in a radial direction. According to the invention, the surface layer 17 is designed as an unhardening layer 18 having a reduced hardness compared to the core 16 of the screw 2. This reduced hardness has been produced subsequently. The radial outer limit of the unhardening layer 18 is formed by the outer surface of the screw 2. The radial inner limit of the unhardening layer 18 is fluent. However, it is symbolized by a line 21.

In the present example, the unhardening layer 18 does not extend along the threaded portion 7, but also along the shank portion 6. In the shank portion 6, the depth T2 of the unhardening layer 18 is located between the line 21 and the outer surface of the screw 2.

In the threaded portion 7, the unhardening layer 18 also extends up to the outer surface of the screw 2. The illustrated depth T1 however only designates a part of the depth of the unhardening layer 18. The depth T1 exists along the thread tip 14 winding about the longitudinal center axis 13, and it is measured in the radial direction perpendicular to the longitudinal center axis 13 to the imaginary axial connecting line 22 between two positions of the thread base 15 being adjacent and being offset by 360°.

Figure 3:
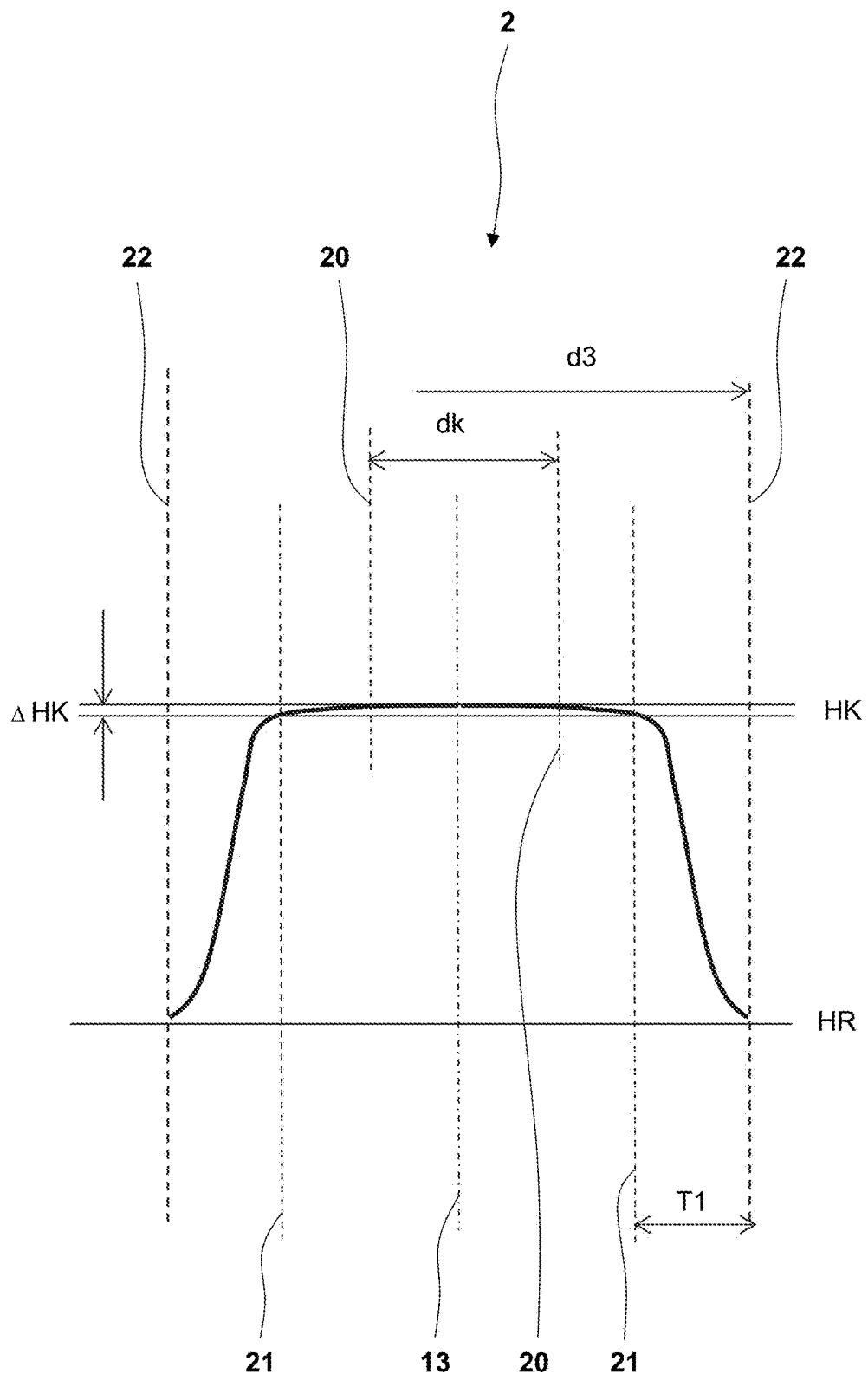
FIG. 3 illustrates the course of the hardness over the cross-section of the screw in the threaded portion.
Figure 4:
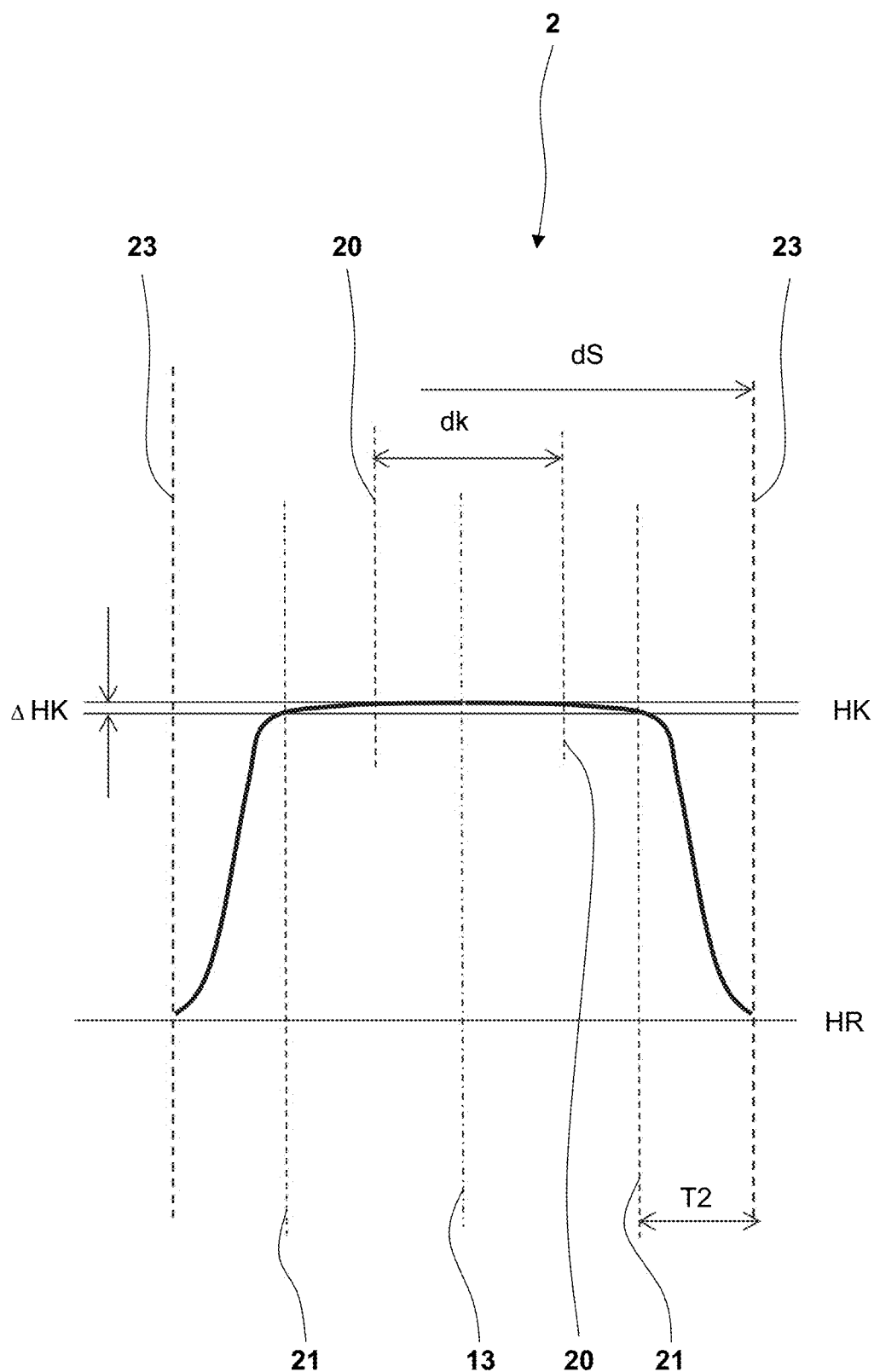
FIG. 4 illustrates the course of the hardness over the cross-section of the screw in the shank portion.

FIG. 3 illustrates the course of the hardness over the cross-section of the screw 2 in the threaded portion 7. The variables contained in FIG. 3 have the following meaning:

d=outer diameter of the thread
dk=diameter of the core of the screw
HK=hardness of the core of the screw
HR=hardness of the surface layer (unhardening layer)
ΔH=hardness difference in the core of the screw
T1=(part of the) depth of the surface layer in the threaded portion FIG. 4 illustrates the course of the hardness over the cross-section of the screw in the shank portion 6. The variables in addition to the ones used in FIG. 3 have the following meaning:

ds=shank diameter of the screw
T2=depth of the surface layer in the shank portion FIG. 5 illustrates exemplary values of the unhardening layer 18 in case of different sizes of the screw 2 in a table. The variables being additionally used in FIG. 5 have the following meaning:

P=pitch of the thread

H=height of the sharp-cut imaginary profile triangle

Many variations and modifications may be made to the preferred embodiments of the invention without departing substantially from the spirit and principles of the invention. All such modifications and variations are intended to be included herein within the scope of the present invention, as defined by the following claims.

We claim:

1. A high-strength screw, comprising:
   a longitudinal center axis;
   a threaded portion having a thread, the thread having a height H corresponding to a height of a sharp-cut imaginary profile section, the thread including a thread tip winding about the longitudinal center axis and having a diameter d and a thread base winding about the longitudinal center axis and having a diameter d3;
   an inner core as seen in cross-section of the screw, the core having a first hardness;
   an outer surface layer as seen in cross-section of the screw; and
   an unhardening layer forming the outer surface layer in the threaded portion, the unhardening layer having a second hardness being reduced compared to the first hardness of the core, the unhardening layer having a depth T1 existing along the thread tip winding about the longitudinal center axis and being measured in a radial direction perpendicular to the longitudinal center axis up to an imaginary axial connecting line between two positions of the thread base being adjacent and being offset by 360°,
   the thread having one of the following pairs of values:
     height H: 0.4 mm to 0.7 mm; depth T1: 0.25 mm to 1.8 mm; or
     height H: 0.71 mm to 1.0 mm; depth T1: 0.25 mm to 2.7 mm; or
     height H: 1.01 mm to 1.5 mm; depth T1: 0.2 mm to 2.7 mm; or
     height H: 1.51 mm to 2.0 mm; depth T1: 0.2 mm to 2.7 mm; or
     height H: 2.01 mm to 2.5 mm; depth T1: 0.15 mm to 3.0 mm; or
     height H: 2.51 mm to 4.0 mm; depth T1: 0.15 mm to 4.0 mm,
   wherein the core has a first hardness of 400 HV to 650 HV, and the unhardeninq layer at its outside has a hardness of 300 HV to 380 HV.

2. The screw of claim 1, wherein
   the core is an inner portion of the screw as seen in cross-section up to a diameter of the core dk=d/4; and
   the first hardness of the core is the average of the hardness within the diameter of the core dk.

3. The screw of claim 1, wherein that the second hardness of the unhardening layer is the average of the hardness within the unhardening layer.

4. The screw of claim 1, wherein the depth T1 is between 0.1 mm and 3.0 mm.

5. The screw of claim 1, wherein the second hardness of the unhardening layer at its outside is reduced by at least 7% compared to the first hardness of the core.

6. The screw of claim 1, wherein the second hardness of the unhardening layer at its outside is reduced by between 10% and 50% compared to the first hardness of the core.

7. The screw of claim 1, wherein
   the core has a tensile strength of between 1300 N/mm$^2$ and 2500 N/mm$^2$; and
   the unhardening layer at its outside has a tensile strength of between 1000 N/mm$^2$ and 1200 N/mm$^2$.

8. The screw of claim 1, wherein
   the core has a tensile strength of between 1400 N/mm$^2$ and 1850 N/mm$^2$; and
   the unhardening layer at its outside has a tensile strength of between 1000 N/mm$^2$ and 1200 N/mm$^2$.

9. The screw of claim 1, further comprising:
   a head;
   a head bearing transition surface; and
   a threadless shank portion, the shank portion including a second unhardening layer forming the outer surface layer in the shank portion, the second unhardening layer having a third hardness being reduced compared to the first hardness of the core.

10. The screw of claim 9, wherein
    the shank portion has an axial length; and
    the second unhardening layer does not extend along the entire axial length of the shank portion.

11. The screw of claim 9, wherein
    the shank portion has an axial length; and
    the second unhardening layer extends along the entire axial length of the shank portion.

12. The screw of claim 1, wherein the screw is made of steel and includes a bainite structure.

13. A high-strength screw, comprising:
    a longitudinal center axis;
    a head;
    a threadless shank portion;
    a threaded portion having a thread;
    an inner core as seen in cross-section of the screw, the core having a first hardness of between 400 HV and 650 HV;
    an outer surface layer as seen in cross-section of the screw; and
    an unhardening layer forming the outer surface layer in the threaded portion, the unhardening layer having a second hardness that has been reduced compared to the first hardness of the core, the second hardness of the unhardening layer in its radial outmost portion being between 300 HV and 380 HV,
    wherein the core has a tensile strength of between 1400 N/mm$^2$ and 1850 N/mm$^2$; and the unhardening layer in its radial outmost portion has a tensile strength of between 1000 N/mm$^2$ and 1200 N/mm$^2$.

14. The screw of claim 13, wherein
    the thread includes a thread tip winding about the longitudinal center axis and having a diameter d;
    the core is an inner portion of the screw as seen in cross-section up to a diameter of the core dk=d/4; and
    the first hardness of the core is the average of the hardness within the diameter of the core dk.

15. A high-strength screw, comprising:
    a longitudinal center axis;
    a head;
    a threadless shank portion;
    a threaded portion having a thread, the thread including a thread tip winding about the longitudinal center axis and having a diameter d;
    an inner core as seen in cross-section of the screw,
      the core being an inner portion of the screw as seen in cross-section up to a diameter of the core dk=d/4, the core having a first hardness being defined as the average of the hardness within the diameter of the core dk,
the first hardness being between 400 HV and 650 HV, and
the core having a tensile strength of between 1400 $N/mm^2$ and 1850 $N/mm^2$;

an outer surface layer as seen in cross-section of the screw; and an unhardening layer,
the unhardening layer forming the outer surface layer in the threaded portion,
the unhardening layer in its radial outmost portion having a second hardness being reduced compared to the first hardness of the core,
the second hardness of the unhardening layer in its radial outmost portion being between 300 HV and 380 HV, and
the unhardening layer in its radial outmost portion having a tensile strength of between 1000 $N/mm^2$ and 1200 $N/mm^2$.

* * * * *